B. P. & F. I. REMY.
SHAFT COUPLING.
APPLICATION FILED JUNE 24, 1909.
958,540.
Patented May 17, 1910.
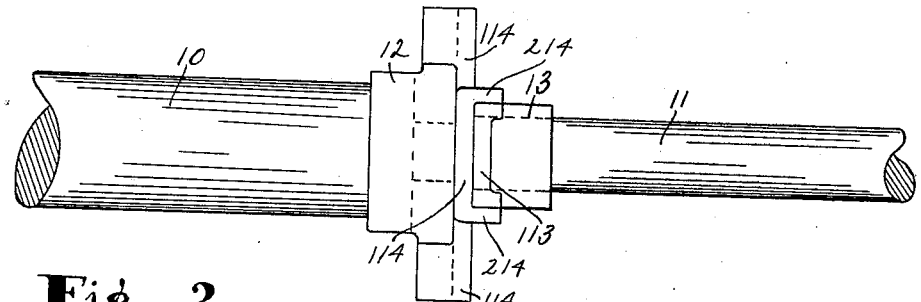
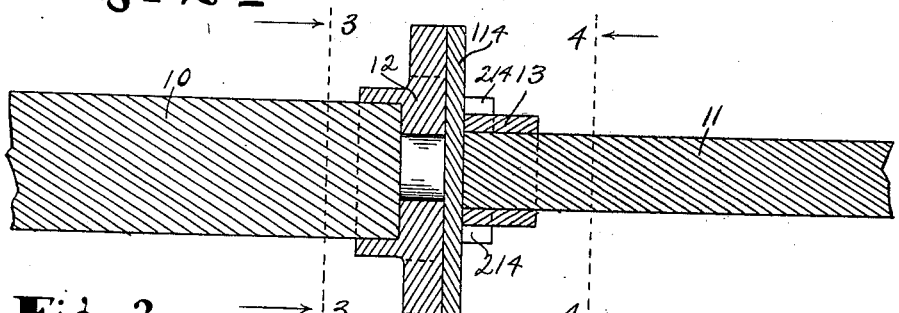
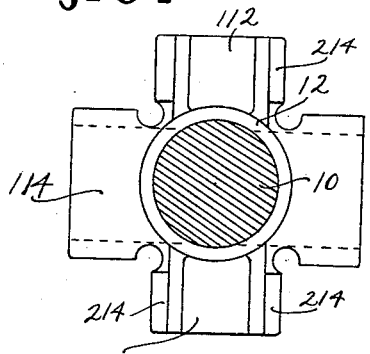
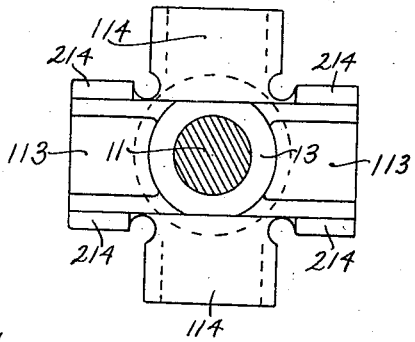
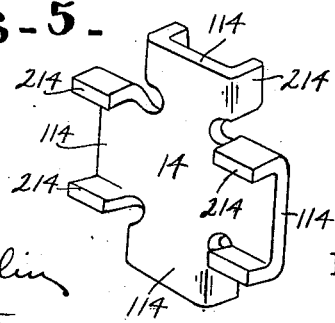
WITNESSES:
O. M. McLaughlin
W. M. Gentle
INVENTORS.
Benjamin P. Remy and
Frank I. Remy.
BY V. H. Lockwood
ATTORNEY.

UNITED STATES PATENT OFFICE.

BENJAMIN P. REMY AND FRANK I. REMY, OF ANDERSON, INDIANA, ASSIGNORS TO THE REMY ELECTRIC COMPANY, OF ANDERSON, INDIANA, A CORPORATION OF INDIANA.

SHAFT-COUPLING.

958,540.  Specification of Letters Patent.  Patented May 17, 1910.

Application filed June 24, 1909. Serial No. 504,010.

*To all whom it may concern:*

Be it known that we, BENJAMIN P. REMY and FRANK I. REMY, of Anderson, county of Madison, and State of Indiana, have invented a certain new and useful Shaft-Coupling; and we do hereby declare that the following is a full, clear, and exact description thereof, reference being had to the accompanying drawings, in which like numerals refer to like parts.

The object of this invention is to provide a shaft coupling for shafts placed end to end or in alinement with each other, which will enable the ends of the shafts to approach each other very closely and yet permit freedom of movement of parts of the coupling, so that they can adjust themselves to inaccurate shaft alinement and without any appreciable loss of motion or play angularly. In certain machinery this construction is of considerable value in the placing of one of the shafts in position where the shaft is on mechanism that is inserted angularly in position with other mechanism. Thus, when one of the shafts is on a magneto and the magneto is to be inserted in a very limited space in another machine, such as an automobile, the shaft cannot be placed in position by longitudinal movement, as there is not room. This enables it to be slipped in angularly and the ends of the two shafts to be very close to each other, so that the shafts take up little room. In fact, the magneto or other driven mechanism, can thus be inserted in place with the coupling attached by letting the magneto down in place and without moving it at all along the line of the shaft.

The chief feature of the invention consists in coupling parts secured to the end of each shaft by a thin flat plate between said parts that loosely engages the sides of said parts, so that the rotary movement of one shaft will be transmitted through the coupling to the other, and yet the parts of the coupling be able to adjust themselves angularly as required by any inaccurate alinement of the shafts.

The full nature of the invention will be understood from the accompanying drawings and the following description and claim.

In the drawings Figure 1 is a plan view of a pair of shafts and a coupling. Fig. 2 is a central, longitudinal section thereof. Fig. 3 is a cross section on the line 3—3 of Fig. 2. Fig. 4 is a cross section on the line 4—4 of Fig. 2. Fig. 5 is a perspective view of the coupling plate.

In the drawings, 10 represents a driving shaft and 11 a driven shaft mounted substantially in alinement with each other by any suitable means not here shown. The coupling in its entirety consists of three parts, the member 12 secured on the driving shaft, the member 13 secured on the driven shaft, and the coupling plate 14 intermediate the other two members.

The two members 12 and 13 secured on the two shafts, respectively, are substantially the same in character, although possibly differing in size of the parts thereof. They consist of a body, central or hub portion, secured to the shaft by a pair of oppositely and radially extending arms 112 and 113, respectively. These arms and the hub, central or body portion of each member are flush with each other at one side so that the adjacent end surfaces of the two coupling members are absolutely flat throughout. These arms may be of any desired width, so long as they are flush with the end surface of the central portion of the coupling member.

The coupling 14 is a relatively thin flat plate throughout the major portion thereof and provided with two pairs of oppositely and radially extending arms 114, said two pairs being at right angles to each other, so that the arms 114 are equidistant from each other and about 90 degrees apart. The sides of each of said arms are turned at right angles to the main portion of the arms to form flanges or lugs 214. The flanges 214 on one pair of oppositely extending arms 114 project to one side of the coupling plate 114, while the flanges 214 on the other pair of oppositely extending arms 114 project in the opposite direction. Said coupling plate 14, therefore, has one pair of arms 114 and flanges 214 adapted to engage and embrace the coupling member 12 and the arms 112 thereof, while the other pair of arms 114 and lugs 214 of the coupling plate are adapted to engage the other coupling member 13 and the arms 113. The engagement between the arms 114 with the flanges of the coupling plate 14 and the arms 112 and 113 of the coupling members 12 and 13 is snug but loose enough to permit a sliding movement of the parts with relation to each other. This engagement is snug enough to prevent any appreciable play or loss of motion of the parts in the transmission of rotary movement from one shaft to the other, and yet loose enough to permit the coupling plate 14 to have sufficient sliding movement to adjust itself to inaccurate alinement of the shafts.

The coupling plate is preferably mounted in connection with one of the coupling members 12 so as to have only limited radial play or movement. This is accomplished by reason of the diameter of the central portion thereof being greater than the space between the flanges 214 on the arms 114, and the flanges on one of said arms 114 being far enough away from the flanges on the opposite arm to permit some lateral play or movement between the coupling plate 14 and the member 12. The other coupling member 13, however, is arranged with uniform width throughout preferably, so that there is no limit to its lateral movement with relation to the coupling plate 14.

What we claim as our invention and desire to secure by Letters Patent is:

A coupling including two rotatable members adapted to be arranged substantially coaxially and each having oppositely and radially extending arms, the arms of one of said members being narrower than the central portion of said member and the arms of the other of said members being of the same width as the central portion thereof, and a coupling plate between said members with oppositely extending arms having flanges turned at a right angle to the body of the coupling plate and engaging the edges of the arms of said coupling members.

In witness whereof, we have hereunto affixed our signatures in the presence of the witnesses herein named.

BENJAMIN P. REMY.
FRANK I. REMY.

Witnesses:
BESSE PERKINS,
C. E. WILLIAMSON.